OR  3,947,182

United Sta[tes Patent]

McCartney

[11] 3,947,182
[45] Mar. 30, 1976

[54] FIBER OPTIC CONNECTOR WITH AXIAL TOLERANCE RELIEF

[75] Inventor: Ronald L. McCartney, Orange, Calif.

[73] Assignee: International Telephone & Telegraph Corporation, New York, N.Y.

[22] Filed: July 21, 1975

[21] Appl. No.: 597,943

Related U.S. Application Data

[63] Continuation-in-part of Ser. No. 518,488, Oct. 29, 1974, abandoned.

[52] U.S. Cl. ............ 350/96 C; 339/74 R; 350/96 B
[51] Int. Cl.² ............................................ G02B 5/16
[58] Field of Search ........ 350/96 C, 96 B; 339/74 R

[56] References Cited
UNITED STATES PATENTS

| | | | |
|---|---|---|---|
| 3,637,284 | 1/1972 | Plyler | 350/96 C |
| 3,806,225 | 4/1974 | Codrino | 350/96 C |
| 3,834,391 | 9/1974 | Block | 350/96 C |
| 3,880,452 | 4/1975 | Fields | 350/96 C |

*Primary Examiner*—John K. Corbin
*Assistant Examiner*—Stewart Levy
*Attorney, Agent, or Firm*—Thomas L. Peterson

[57] ABSTRACT

An elongated hollow termination pin assembly for mechanically terminating a fiber bundle of a fiber optic cable. The pin assembly includes an elongated hollow pin with coaxially slidable outer sleeve and an O-ring of resilient material mounted in a groove about the pin immediately adjacent to the end of the sleeve toward the terminal end of the cable. A backward facing shoulder is provided about the circumference of the sleeve so that a retaining clip within the connector shell can restrain backward axial movement of the sleeve. The pin can slide within the sleeve, however, and is resiliently constrained by the O-ring to provide a positive abutment force at the interface of the fiber bundles, dampen contact vibrations, and absorb axial tolerances. Alternatively, the O-ring may be positioned between a forwardly facing shoulder on the connector body and the retaining clip, with a tine on the clip engaging a rearwardly facing shoulder on the pin.

18 Claims, 3 Drawing Figures

FIBER OPTIC CONNECTOR WITH AXIAL TOLERANCE RELIEF

CROSS-REFERENCE TO RELATED APPLICATION

This application is a continuation-in-part of my copending application Ser. No. 518,488, filed Oct. 29, 1974 now abandoned.

BACKGROUND OF THE INVENTION

1. Field of the Invention

The invention relates to connectors for use with fiber optic cables.

2. Description of the Prior Art

The employment of fiber optic cables or light guides, also sometimes referred to as optical communication fibers, for the transmission of information-bearing light signals, is now an established art. Much development work has been devoted to the provision of practical low-loss glass protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for the benefit of the skilled reader in understanding the state of fiber optic art in general.

An article entitled "Fiber Optics" by Narinder S. Kapany, published in the SCIENTIFIC AMERICAN, Vol. 203, Pages 72–81, dated November, 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the Bell System Technical Journal, Vol. 50, No. 10, December 1971, specifically to an article by D. L. Bisbee, entitled "Measurement of Loss Due to Offset, and End Separations of Optical Fibers." Another Bell System Technical Journal article of interest appeared in Vol. 52, No. 8, October 1973 and was entitled "Effect of Misalignments on Coupling Efficiency on Single-Mode Optical Fiber Butt Joints" by J. S. Cook, W. L. Mammel and R. J. Grow.

The patent literature also contains much information relative to the state of this art. For example, U.S. Pat. No. 3,624,816 describes a "Flexible Fiber Optic Conduit." The device described there uses a plurality of light conducting fibers in a flexible cable type arrangement.

Concerning the utility of fiber optic cables and therefore the utility of connectors for such cables, various systems are described in the patent literature which employ fiber optic cables. One example of such a utilization system is described in U.S. Pat. No. 3,809,908.

Yet another patent of interest is entitled "Glass Fiber Optical Devices," U.S. Pat. No. 3,589,793. That reference relates to the fiber optic bundles and the glass fibers themselves, as well as to a method of fabrication for the fiber optic elements themselves.

A selection of U.S. patents relation more particularly to optical cable connectors includes U.S. Pat. Nos. 3,790,791; 3,734,594; 3,637,284; 3,572,891; 3,806,225; 3,758,189 and 3,508,807 are representative of the connector prior art.

It is known that, in a fiber optic bundle, it is very desirable to compress the fibers as close together as possible, so that the unused, or void area between fibers, is reduced to a minimum. It is also known that one important factor in joined fiber optic cable connections having the least light-loss at transfer from surface to surface is provision of an axially tight contact at the fiber end interfaces. This is true whether or not an interface gel or other material is used at the fiber bundle abutment.

In the prior art, there has been mainly reliance on close tolerances or interface materials to deal with the problems present. These problems include optical gaps at abutment points, mechanical damage to the bundle end surfaces and the potential for variations in optical transmission through an insufficiently positive abutment. The maintenance of close tolerances involves high costs and other disadvantages and optical gaps and mechanical damage to the fiber bundle ends can deteriorate the light transfer. Vibration effects have deleterious effects including possible introduction of modulation on the light intensity level.

The manner in which the present invention deals with such problems of the prior art will be understood as this description proceeds.

SUMMARY OF THE INVENTION

The present invention concerns a fiber optic cable terminating pin assembly for use in a connector assembly comprising at least one fiber optic circuit connection.

The principal novel feature of the present invention involves the structure of the termination pin assembly allowing a limited amount of axial sliding against a resilient force (of at least one of the termination pin bodies) to allow for a nominal interference fit at the point of abutment of the optic fibers at the terminal ends of abutting termination pins. This abutment may be with or without an optical interface part, or with or without liquid gel interface materials, insofar as the present invention is concerned. The result is a structure allowing for axial tolerances while providing a positive abutment force and dampening of contact vibration at the interface of the two fiber bundles.

At least one of the abutting hollow pin bodies is an assembly according to the present invention with a coaxially slidable outer sleeve an an O-ring of resilient material mounted in a circumferential groove about the pin body immediately adjacent to the end of the said sleeve on the side toward the terminal end of the pin body and cable. A backward facing shoulder is provided about the circumference of the slidable sleeve and when the assembly is mounted in one or the other or both mating connector shells, retaining clips or some other means can be employed to prevent backward movement (away from the point of cable abutment) of the said outer slidable sleeve. As a result of an actual or near interference fit at the point of abutment, however, the pin body within the slidable sleeve can "back off" a limited amount against the resilient resisting force of the O-ring. Alternatively, the O-ring may be positioned between a forwardly facing shoulder on the connector body and the retaining clip with a tine on the clip engaging a rearwardly facing shoulder on the pin.

The O-ring, in addition to its capability for resilient axial compression, can also expand circumferentially and thereby "ride up" the chamferred side of the circumferential groove retaining it.

A form in which the invention may be effectively and economically constructed will be seen from the following description of a typical embodiment thereof.

DESCRIPTION OF THE PREFERRED EMBODIMENT

Figure 1:
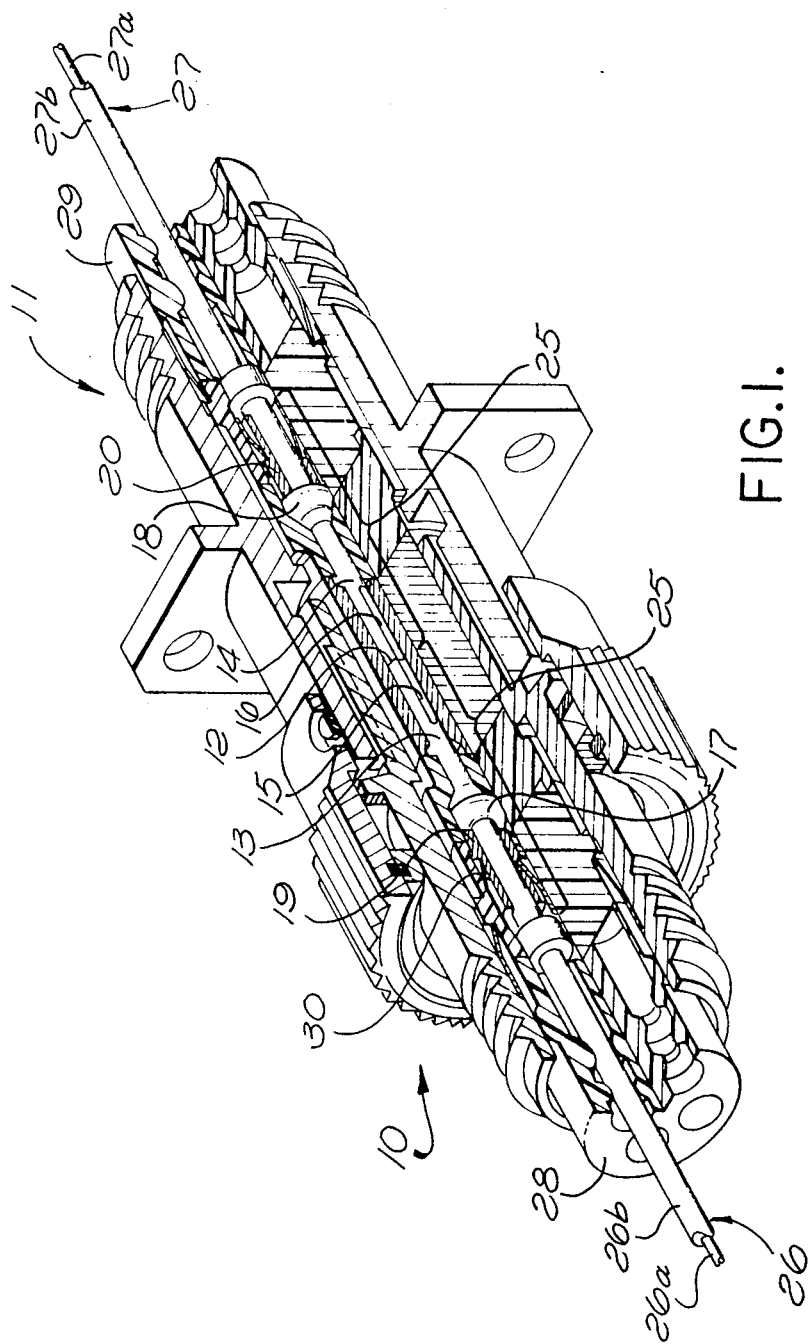
FIG. 1 is a partial cutaway view showing a termination pin assembly in accordance with the present invention, as it might be typically installed in mating connector shells.

Referring now to FIG. 1, two mating connector shell assemblies 10 and 11, are illustrated. These connector shells may be very similar to those used in the well known electrical connector art.

As in the electrical connect art generally, insert parts 28 and 29, usually are molded from an insulating material, and serve to hold a plurality of cables generally in a connectable configuration. In the case of FIG. 1, only one pair of cables is shown connected, although insert parts 28 and 29 are drawn for accommodation of four pairs of connectable cables. The pair of fiber optic cables 26 and 27 to be connected in the illustration of FIG. 1 comprise a fiber optic bundle 26a with its jacket 26b on the left, and a fiber optic bundle 27a with its jacket 27b on the right.

The termination pins in accordance with the present invention are shown at 25 in two places on FIG. 1, abutting each other at their extreme ends at 12. It will be realized from FIG. 1 that each of the cable fiber bundles 26a and 27a is terminated in a substantially identical termination pin 25, these abutting at their extreme ends to bring optical contact between fiber bundles. The optical contact at 12 is either a direct abutment with or without interface gel or oil materials, but may include an optical, refraction index matching interface piece at 12. The actual nature of the interface is incidental insofar as the present invention is concerned.

Figure 2:
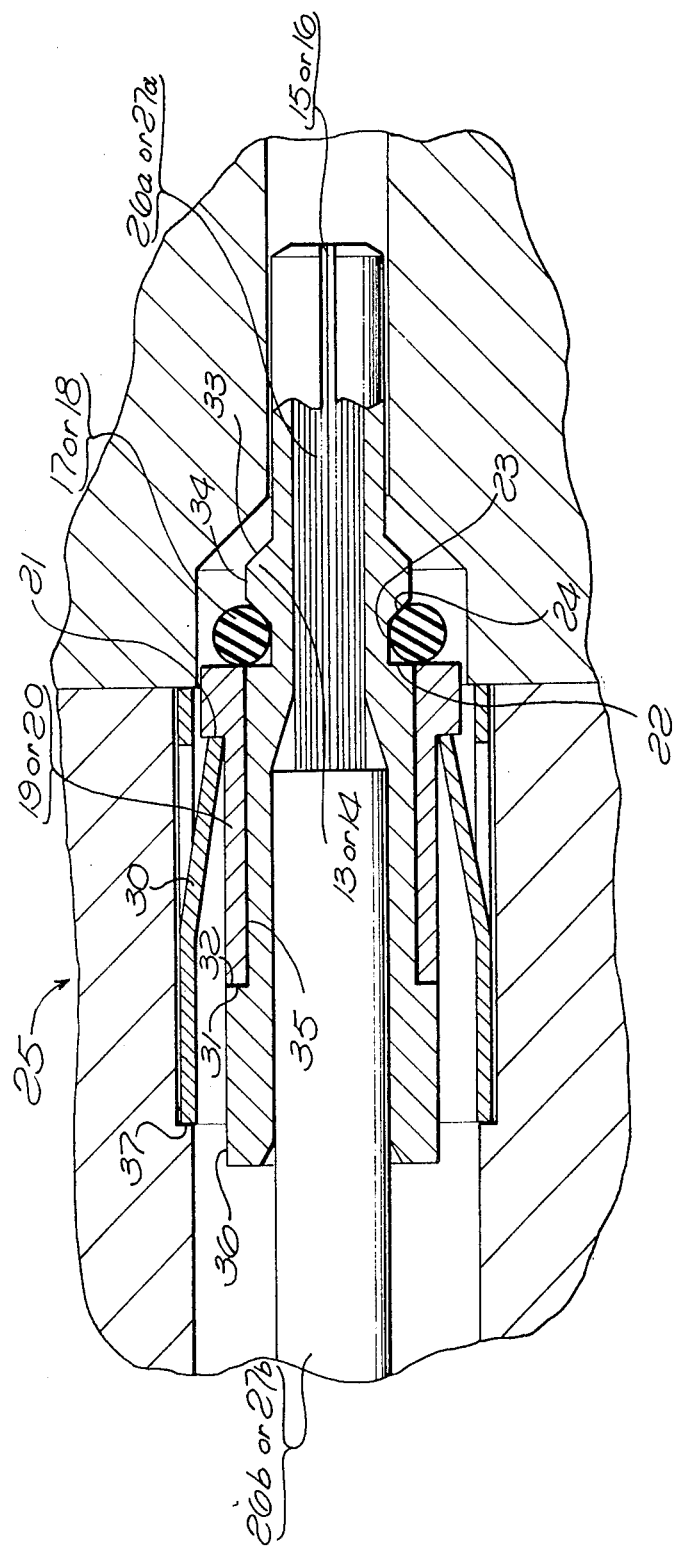
FIG. 2 is a detail illustrating the structure of the termination pin in accordance with the present invention.

It is advantageous to refer at this time also to FIG. 2, so that the detailed elements of a termination pin assembly according to the present invention can be more fully explained. Contemporaneously these elements may be visually related to FIG. 1.

FIG. 2 depicts one or the other of the termination pins illustrated in FIG. 1, and identified simply as 25.

The termination pin 25 is shown employing the "split tine" (or "spring tine") arrangement for gripping and compacting the individual glass fibers of 26a or 27a in the vicinity of the point of interface abutment. This split tine arrangement is described in U.S. patent application Ser. No. 510,310, filed Sept. 30, 1974, entitled: Fiber Optic Connector with Split Tine Optic Contact Arrangement. That co-pending application is of common inventorship with respect to the present application and is assigned to the same assignee.

The terminating pin assembly depicted in detail in FIG. 2 includes an elongated hollow body at 13 and 14 (depending upon which pin is referred to on FIG. 1). The aforementioned split tine effect is produced by means of the groove 15 or 16, again depending upon which of the two pins is considered on FIG. 1. The end toward the split tine, i.e., to the right of FIG. 2, is considered to be the terminal end of the terminating pin assembly and is, of course, the end which abuts the other terminating pin assembly at 12 in FIG. 1. The pin body will be seen to increase in outside diameter looking from right to left on FIG. 2 at 33, to a second and larger outside diameter 34. The shape of the transistion 33 to this larger diameter is not of any great importance, except that it may be desirable to have it match (at least approximately) inside cavity formed by the retaining parts within the corresponding connector shell. The pin outside diameter 34 may be substantially the same as at 35, or may differ slightly as will be obvious once the present invention is understood. Proceeding still farther to the left, it will be noted that the pin body again increases in diameter to that shown at 36, forming a shoulder at 31.

In the absence of the O-ring 17 or 18, the sleeve 19 or 20, (yet again depending upon which pin from FIG. 1 is being viewed) may be inserted over the pin body along the diameter 35 from the terminal end of the pin assembly. Accordingly, it will be realized that if there is any difference between pin body diameters at 34 and 35, it is necessary for 34 to be the smaller of the two.

It will be noted that the slidable sleeve 19 or 20, has a larger diameter portion adjacent to the O-ring, thereby forming a backward looking shoulder at 21. Thus, a spring retaining finger 30 (which may itself have a substantially circular cross-section in a plane perpendicular to the axis of FIG. 2, and may also include axial grooves to form independent spring fingers) engages the shoulder 21 and also the internal edge of a counterbore within the connector shell at 37.

Accordingly, it will be realized that the part 30 effectively restrains the slidable sleeve (19 or 20) from backward movement, i.e., axial movement away from the aforementioned terminal end of the pin assembly.

It will be realized that the terminating pin assembly would be fully assembled including the O-ring 17 or 18 before it is inserted within the connector shell such that this engagement by part 30 can occur.

It will be noted that the O-ring 17 or 18 is retained with a circumferential groove in the pin body to a depth represented at 23 on FIG. 2 and having a rearward groove wall 22 which is preferably perpendicular to the axis of the pin. The forward wall of the groove is chamferred or sloped as indicated at 24. The angle of this chamfer is not particularly critical, but normally would be in the vicinity of 45°.

Although the slidable sleeve 19 or 20 is restrained from translational movement (to the left on FIG. 2) by abutment at 31 and 32, this is more of an assembly and manufacturing convenience than a necessity in the fully assembled and installed condition. This is because the part 30 effectively restrains the said slidable sleeve from leftward movement, and extra initial projection of the pin body before connector mating is not of much significance.

Assume at this time, that the configuration of FIG. 1 has been assembled and that a nominally interference fit situation has been pre-established at 12 when the connector shells are fully mated. The hollow pin body 13 or 14 is thus subjected to a force causing it to move to the left (as viewed on FIG. 2). The O-ring 17 or 18 is then subjected to an axially directed compression force. Since the O-ring is fabricated from a resilient material, it may not only compress between the surfaces 22 and 24, but will also "ride up" on the chamferred groove wall 24 to a certain extent. In doing so, the O-ring also expands radially or circumferentially and provides a radially inward force against the chamferred groove wall which is translated to an axial force also tending to thrust the pin body forward. It will be evident that the leftward movement of the hollow pin body is resisted by the resilient reaction forces thereby generated, and this force remains to insure positive abutment pressure between fiber bundle terminal ends in the connector mated condition, as depicted in FIG. 1.

Suitable materials for the various parts of the structure described will be immediately evident to those skilled in this art. Normally, the hollow pin body 13 or 14 is constructed from a relatively high strength metal, necessarily having certain spring characteristics if the spring tine fiber bundle gripping arrangement at 15 or 16 is contemplated. Of course, the spring tine feature may not be used, the bonding of the optical fibers in the termination pin being provided by an adhesive or other means.

The O-ring may be neoprene or some other synthetic or natural rubber material or one of the resilient polymers having the desired elasticity characteristic.

The parts generally referred to as 28 and 29 on FIG. 1, which perform the general alignment functions within the connector shells may be of moldable plastic material but, since there are no electrical insulating requirements in fiber optic connectors, these parts need not be non-conductive, per se. The influence of environmental considerations would, generally speaking, dictate the exact choice of materials for the parts of the assembly in accordance with the present invention.

Figure 3:
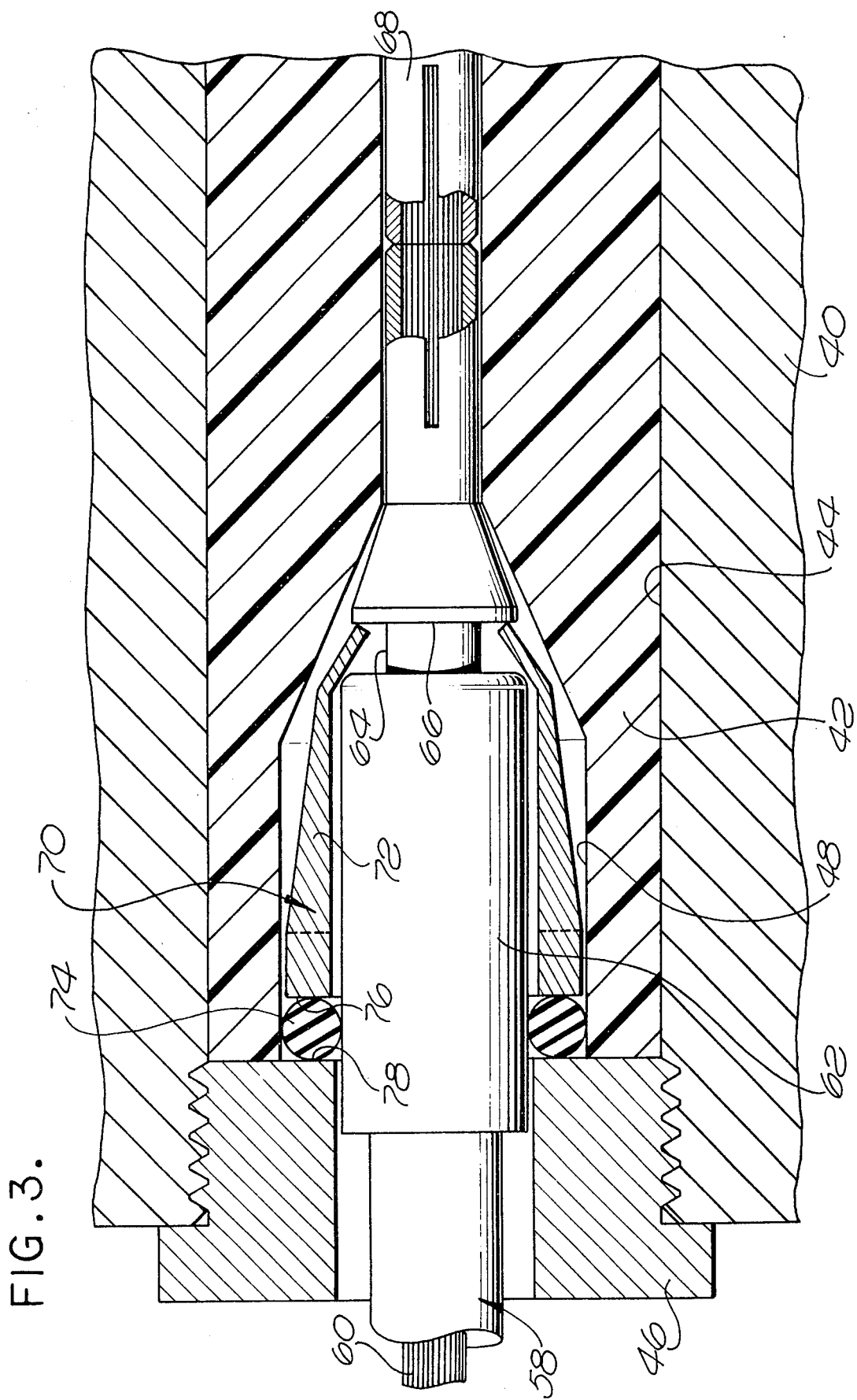
FIG. 3 is a detail illustrating a modified form of the termination pin assembly in accordance with the invention.

While the fiber bundle interconnection arrangement disclosed in FIGS. 1 and 2 are incorporated into the shells of an electrical connector, as in a conventional electrical connector, the interconnection arrangement could also be utilized without the use of such shells. For example, the inserts which hold the spring retaining clips 30 and the pin terminated fiber optic cables could be mounted in plastic bodies which slidably interengage with each other without the use of outside metal shells with a coupling nut on one shell or coupling to the mating shell. Further, the fiber cable interconnection arrangement of the present invention could be incorporated in a supporting plate, such as a bulkhead. Such an arrangement is illustrated in FIG. 3 wherein the bulkhead is designated 40. An insert 42 is mounted within a bore 44 which extends through the bulkhead. The insert is retained in the bore 44 by an externally threaded retaining nut 46. A passage 48 extends longitudinally through the insert 42. A fiber optic cable 58 having a fiber bundle 60 therein and terminated by a termination pin 62 is mounted in one end of the passage 48. The termination pin 62 may be similar to the termination pin 25 described hereinbefore, except that the groove 64 therein has a rearwardly facing shoulder 66 which is transverse to the axis of the pin. A mating termination pin 68 is mounted in the passage 48 in abutment with the end of the pin 62. The pin 68 terminates a second fiber optic cable, not shown. Pin 68 may be either permanently mounted in the passage 48 in insert 42 or removably mounted therein by the use of a suitable retention clip. The retention clip 70 for the pin 62 has a plurality of forwardly and inwardly extending spring fingers 72 the tips of which extend into the groove 74 to engage the shoulder 66 on the pin, thereby limiting rearward axial translation of the pin in the passage 48. Rather than utilizing a slidable sleeve between the retention clip and the O-ring as in FIGS. 1 and 2, in this embodiment of the invention the slidable sleeve is eliminated and the O-ring 74 is disposed between the rear 76 of the clip and the forwardly facing shoulder 78 defined by the front face of the nut 46. The O-ring 74 can obviously be replaced by any suitable annular resilient ring or for that matter could constitute any form of a spring member which will bias the retention clip 70 in the forward direction. Thus, it is seen that the resilient member 74 will insure positive abutment pressure between the fiber bundle terminal ends and will provide relief for axial manufacturing tolerances as in the first embodiment of the invention. This embodiment has the advantage that it requires fewer number of parts because the slidable sleeve on the termination is eliminated. By the arrangement illustrated in FIG. 3, individual fiber optic cables terminated by termination pins may be inserted and extracted directly from the bulkhead 40 for connection to mating fiber optic cables without the use of connector shells or the like. The termination pin 62 is released from the panel 40 by inserting a suitable longitudinally split tool, as well in the art, through the bore in the nut 46 under the ring 74 and between the space between the retention clip 70 and the surface of the pin 62 until the end of the tool engages under the forward ends of the spring finger 72, lifting the fingers out of the groove 64 thus out of engagement with the shoulder 66. Thereupon, the pin 62 may be withdrawn rearwardly from the passage 48 in the bulkhead 40.

Modifications and variations in the structure illustrated and described will suggest themselves to those skilled in this art, once the principle of the present invention is understood. Accordingly, it is not intended that the scope of the invention should be considered limited by the drawings or this description, these being illustrative and typical only.

What is claimed is:

1. A termination pin assembly for adapting a fiber optic cable for insertion into a connector assembly, comprising:
   a hollow elongated pin body having an axial bore of such a diameter over a predetermined axial dimension from a first end of said pin body so as to accommodate insertion of the optical fiber of said cable through said bore for at least said predetermined axial dimension, said first end of said pin body being the terminal end thereof when said cable is inserted within said pin:
   a circumferential groove about a central portion of said pin body, said groove having first and second side walls, said first side wall being nearest said first end of said pin body;
   an axially slidable sleeve mounted to slide over at least a portion of the outside surface of said pin body extending from said groove away from said first end of said pin body; and
   resilient annular ring means installed within said groove, said ring means being compressively engaged between said slidable sleeve and said first side wall of said groove and providing a resilient force tending to resist axial movement of said pin body first end toward said slidable sleeve.

2. In a fiber optic connector for providing a removable light signal connection between the ends of at least one pair of fiber optic cables, said pair consisting of first and second cables, each containing a fiber optic bundle comprising at least one light transmitting fiber, said connector having first and second mating connector shells and corresponding guide means for holding said first and second cables in substantially colinear positions with said ends of said first and second fiber bundles in substantial abutment when said shells are mated; the combination comprising:

first and second elongated hollow cable terminating pins corresponding respectively to each of said first and second cables, said pins each having an axial cavity therethrough, having an inside diameter for a predetermined axial length from a first pin end for accommodating said fiber bundle of the corresponding cable inserted therein, said first pin end being substantially coextensive with said end of the corresponding cable;

means for bonding said fiber bundle within at least a portion of said axial cavity to provide substantial resistance to axial movement of said fiber bundles within said hollow pins;

means comprising a coaxial sleeve slidably fit about the outside diameter of a central portion of at least one of said first and second terminating pins;

first means associated with the internal cavity of at least the corresponding one of said connector shells for restraining axial translation of said coaxial sleeve in a direction away from the point of abutment of said cable ends;

and second means including a resilient member associated with both the body of said termination pin and said coaxial sleeve to permit relatively small axial translation of said termination pin within said sleeve thereby to provide a compression force at the point of said abutment of said first and second fiber optic bundles thereby also providing relief for axial manufacturing tolerances.

3. Apparatus according to claim 2 in which said coaxial sleeve includes a circumferential shoulder facing in a direction opposite said point of abutment of said first and second optical fiber bundles and said first means includes a plurality of spring tines axially constrained within the internal cavity of said connector shell, said spring tines bearing resiliently against the outside periphery of said coaxial sleeve and engaging said circumferential shoulder to constrain said sleeve from axial movement away from said point of abutment.

4. Apparatus according to claim 2 in which said first means are provided in the internal cavities of both of said connector shells and said second means are provided for both first and second termination pins.

5. Apparatus according to claim 2 further defined in that said second means includes a circumferential retaining groove in the wall of said pin beginning substantially at the end of said coaxial sleeve closest to said point of abutment of said fiber bundles, and an O-ring in said groove, said O-ring having an outside diameter greater than the inside diameter of said coaxial sleeve.

6. Apparatus according to claim 5 in which the wall of said groove closest to said first end of said pin is sloped radially outward toward said first end of said pin thereby to permit said O-ring to climb said groove wall in response to axial thrust of said pin in the direction away from said point of abutment of said fiber bundles.

7. Apparatus according to claim 2 further defined in that said second means includes a circumferential groove in the wall of said pin, said groove having a first sidewall lying adjacent to the end of said coaxial sleeve toward said point of abutment of said first and second fiber optic bundles and a second wall spaced toward said point of abutment, said second wall being sloped so that the width of said groove is greater at its greatest diameter than at its least diameter, and an O-ring installed within said groove, said O-ring responding to axial thrust of said pin in the direction away from said point of abutment by climbing said second groove wall thereby to provide a resilient reaction to said thrust to keeps said point of abutment under compressive stress.

8. Apparatus according to claim 7 further defined in that said second means includes a circumferential groove in the wall of said pin, said groove having a first sidewall lying adjacent to the end of said coaxial sleeve toward said point of abutment of said first and second fiber optic bundles and a second wall spaced toward said point of abutment, said second wall spaced toward said point of abutment, said second wall being sloped so that the width of said groove is greater at its greatest diameter than at its least diameter, and an O-ring installed within said groove, said O-ring responding to axial thrust of said pin in the direction away from said point of abutment by climbing said second groove wall thereby to provide a resilient reaction to said thrust to keep said point of abutment under compressive stress.

9. A termination pin assembly for adapting a fiber optic cable for insertion into a connector assembly, comprising:

a hollow elongated pin body having an axial bore of such a diameter over a predetermined axial dimension from a first end of said pin body so as to accommodate insertion of the fiber optic bundle of said cable through said bore for at least said predetermined axial dimension, said first end of said pin body being the terminal end thereof when said cable is inserted within said pin;

a circumferential groove about a central portion of said pin body, said groove having its side wall nearest said first end of said pin body sloping outward such that the top of said groove is wider in the axial dimension than is the bottom;

an axially slidable sleeve mounted to slide over at least a portion of the outside surface of said pin body extending from said groove away from said first end of said pin body;

and an O-ring installed within said groove, said O-ring being compressively engaged between said slidable sleeve and said sloping side wall of said groove, thereby to provide a resilient force tending to resist axial movement of said pin body first end toward said slidable sleeve.

10. Apparatus according to claim 9 in which means are included for securing said fiber optic bundle of said cable within said pin body.

11. Apparatus according to claim 9 in which said sloping side wall of said groove makes an angle of approximately 45° with respect to the axial centerline of said pin body.

12. In a fiber optic connector assembly for providing a removable light signal connection between the ends of at least one pair of fiber optic cables, said pair consisting of first and second cables each containing at least one light transmitting fiber, said connector assembly having means for holding said first and second cables in substantially colinear positions with the forward ends of said first and second cable in substantial abutment the combination comprising:

first and second elongated hollow cable terminating pins mounted respectively on the forward ends of said first and second cables, said pins each having a front end substantially coextensive with the forward end of its corresponding cable fiber;

first means associated with at least one of said pins for restraining axial translation of said pin in a direction away from the point of abutment of said cable fiber ends; and second means including a resilient member associated with said one pin and said first means permitting relatively small axial translation of said pin and providing a compression force at said point of abutment thereby providing relief for axial manufacturing tolerances.

13. A connector assembly according to claim 12 in which said first and second means are provided for both said first and second termination pins.

14. A connector assembly according to claim 12 including a coaxial sleeve slidably fit about said one pin, said second means including a circumferential retaining groove in the wall of said one pin beginning substantially at the end of said coaxial sleeve closest to said front end of said one pin, said resilient member comprising an annular resilient ring in said groove, said ring having an outside diameter greater than the inside diameter of said sleeve.

15. A connector assembly according to claim 14 in which said ring is an O-ring and the wall of said groove closest to said front end of said one pin is sloped radially outward toward said front end thereby to permit said O-ring to climb said groove wall in response to axial thrust of said pin in the direction away from said point of abutment.

16. A connector assembly according to claim 14 in which said coaxial sleeve includes a circumferential shoulder facing in a direction opposite said point of abutment and said first means includes a plurality of spring tines axially constrained within said connector assembly, said spring tines bearing resiliently against the outside periphery of said coaxial sleeve and engaging said circumferential shoulder to constrain said sleeve from axial movement away from said point of abutment.

17. A connector assembly according to claim 12 including a fixed shoulder in said connector assembly behind said first means and facing in the direction toward said point of abutment, a rearwardly facing shoulder on said one pin in front of said first means, said resilient member and said first means being positioned between said shoulders.

18. A connector assembly according to claim 17 wherein said resilient member is disposed between said fixed shoulder and the rear of said first means, the front of said first means engages said rearwardly facing shoulder on said one pin.

* * * * *